Feb. 11, 1941.  W. SWERDLOFF  2,231,781
APPARATUS FOR DETERMINING WEIGHT RELATIONSHIP
Filed Dec. 20, 1937
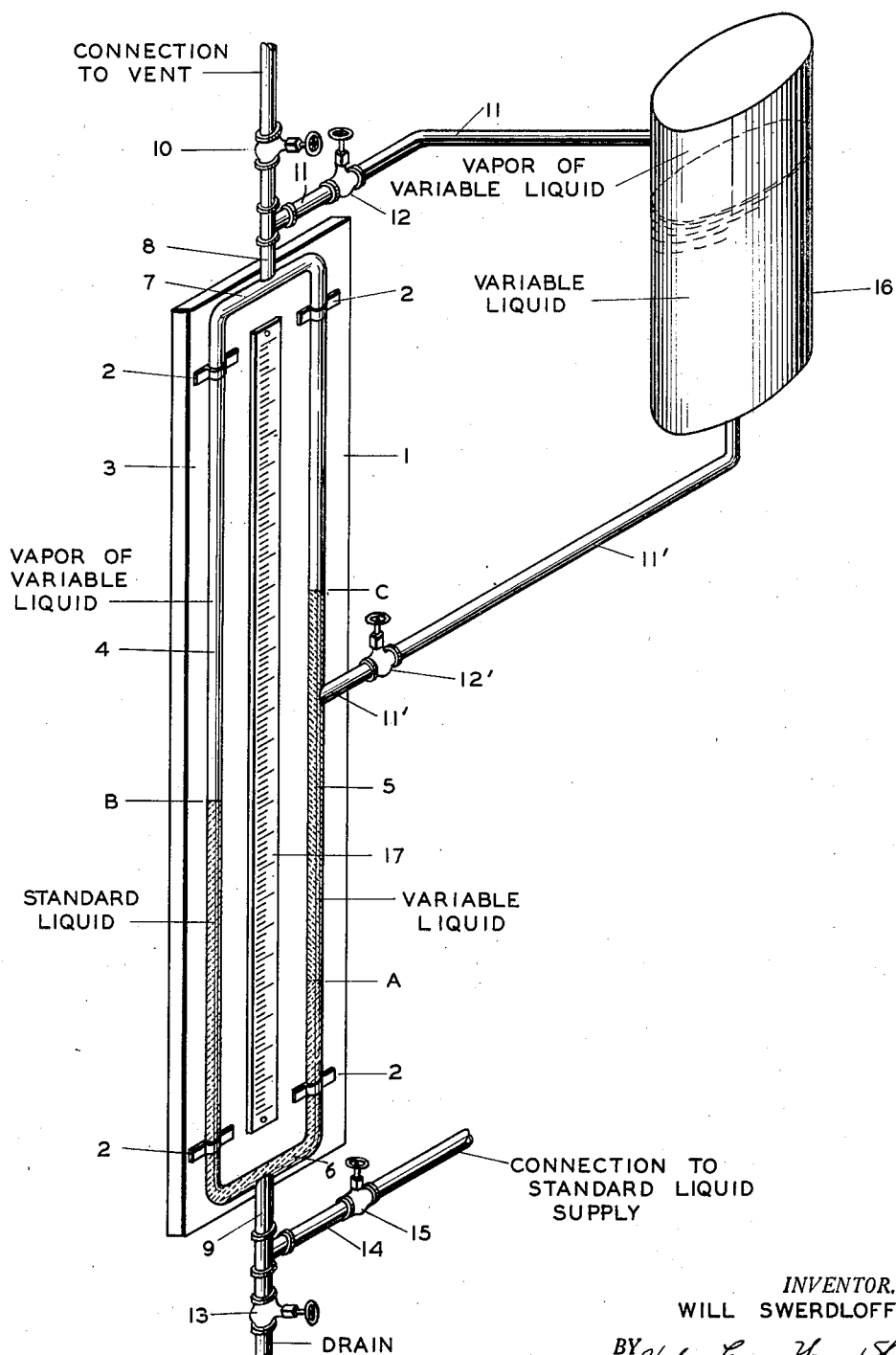
INVENTOR.
WILL SWERDLOFF
BY *Hudson, Connor, Young & Shanley*
ATTORNEYS.

Patented Feb. 11, 1941

2,231,781

UNITED STATES PATENT OFFICE 2,231,781

APPARATUS FOR DETERMINING WEIGHT RELATIONSHIP

Will Swerdloff, Bartlesville, Okla., assignor to Phillips Petroleum Company, a corporation of Delaware Application December 20, 1937, Serial No. 180,911

5 Claims. (Cl. 265—44)

The present invention involves improvements in apparatus for the determination of the weight relationship of a volatile liquid to a standard liquid.

At the present, weight relationships of liquids are usually determined by the use of hydrometers. To determine the gravity of gasoline, the method now used is to draw a sample of gasoline into a glass bomb that contains a hydrometer, the gravity of the gasoline then being read on the floating hydrometer. This method was satisfactory as long as the gasoline was of low vapor pressure. However, with the present trend of manufacturing as high gravity gasolines as possible, the vapor pressure of the gasoline is much higher than formerly. Because of this high vapor pressure much difficulty is being encountered in securing an accurate gravity measurement of the gasoline by use of the enclosed hydrometer apparatus. The reason for the difficulty is that the bomb must first be chilled to minimize vaporization of the gasoline. Then when enough liquid is finally placed in the tube it is usually too cold for the temperature scale on the hydrometer. On warming the liquid the pressure developed because of the evolution of more vapor is often sufficient to crush the hydrometer. Such an occurrence naturally stops the determination. Then too, even though nothing occurs to hamper the operation, the liquid is no longer the same as the liquid that was in equilibrium in the container or tank in which it was originally made, for the liquid in the bomb will release vapor. This changes the composition of the liquid and an erroneous gravity determination is made.

By the use of the proposed device herein described, the above complications are avoided in that no hydrometer is necessary for the specific gravity determination, the liquid whose gravity is being determined is unchanged in the apparatus and it is always in equilibrium with the vapor in the tank or container in which it was originally contained. This makes certain that the gravity is being taken of an accurate sample and that the pressure on the device will never exceed the pressure on the tank in which it was originally held.

An important object of the present invention is to provide an apparatus for determining the specific gravity of a volatile liquid safely, accurately, and conveniently.

A further important object of the present invention is to determine the specific gravity of a volatile liquid under its normal conditions.

The drawing shows a view in elevation of an apparatus embodying the present invention and a diagrammatic view of a system for carrying out the method.

Reference numeral 1 indicates a support to which is attached by means of brackets 2, a vessel indicated generally at 3 in the form of a closed loop of tubing comprising two vertical transparent sections 4 and 5 and two end connecting members 6, 7. It will be apparent that vessel 3 is made up of a U tube or manometer 4, 5, 6 closed by member 7 and can be constructed in any convenient manner to form equivalent structure.

Pipes 8 and 9 are connected into members 6 and 7 and pipe 11' is connected into section 5 but may be connected at any desirable position to accomplish the purposes hereinafter described. Connected in pipe 8 is a valve 10 and a pipe 11 having a valve 12. Connected in pipe 9 is valve 13 and a pipe 14 having a valve 15. Pipes 11 and 14 are shown connected into pipes 8 and 9, respectively, as a matter of convenience in construction but obviously may be connected directly to vessel 3 if desired. In the embodiment shown in the drawing pipe 8 is used to vent vessel 3, pipe 9 to drain it. The purpose of pipe 14 is to admit standard liquid to vessel 3.

Shown diagrammatically is a receptacle 16 for holding the gasoline or other variable liquid to be tested with a space above the liquid which contains, usually at superatmospheric pressure, vapor in equilibrium with the variable liquid. A pipe 11' having a valve 12' connects section 5 of vessel 3 with receptacle 16 below the liquid line of the variable liquid. Pipe 11 is connected to receptacle 16 in the vapor space.

In operation with vent pipe valve 10 closed, valves 12 and 15 closed, and drain valve 13 open, valve 12 is cracked to allow the vapors from receptacle 16 to pass through vessel 3 to displace the air therein. Valves 13 and 12 are then closed and vent valve 10 opened. Water, or some other standard liquid immiscible with the liquid whose gravity is being determined, is allowed to flow into the device through pipe 14 to some convenient level. Since the same pressure is present in both sides of vessel 3, the liquid in both of the transparent sections 4 and 5 will be at the same level. Then the vent pipe valve 10 is closed and valve 12 to the vapor space of receptacle 16 is opened. Since the pressure on both sections remains the same, the levels of the standard liquid remain unchanged. Now the valve 12' to the gasoline or variable liquid supply is opened and a convenient amount is allowed to flow through pipe 11' into one side of the device. Since the admitted gasoline or variable liquid is immiscible with the standard liquid, it will displace a head of the standard liquid that will balance the head of the variable liquid. By measuring the heights of the two balanced liquid heads, the specific gravity or any other weight relationship, may be computed. When appreciable the weight of the vapor must be considered, the head of vapor in one section of vessel 3 being greater than in the other.

In actual practice, a measuring scale 17 is used with the apparatus and readings are obtained by the operator ot the points A, B, and C, as shown on the drawing.

The following describes the method of calculation used. Referring to the attached drawing—

Let A equal scale reading where column of gasoline, or liquid whose gravity is being determined, joins the water, or standard liquid level.

B equal scale reading of water, or standard liquid, level.

C equal scale reading of gasoline, or liquid whose gravity is being determined, level.

Also

Let X equal the unknown specific gravity of the gasoline, or variable liquid.

M equal the specific gravity of the water or standard liquid,

N equal the specific gravity of the vapor (all specific gravities referred to water at 60° F.)

Then

B—A, the head of water, or standard liquid, is balanced by

C—A, the head of gasoline or variable liquid and C—B, the head of vapor.

And $(C-A)(X)$ equals $(B-A)(M)+(C-B)(N)$ $\therefore X$ equals $\frac{(B-A)(M)+(C-B)(N)}{(C-A)}$ This last equation gives the specific gravity of the gasoline or variable liquid, when at the temperature of the gasoline or variable liquid in the apparatus, referred to water at 60° F.

From this specific gravity value, any other weight relationship may be computed. As an example, °A. P. I. of gasoline may be determined in the following manner:

By definition °A. P. I. equals $$\frac{141.5}{\text{Sp. Gr. } 60°/60° \text{ F.}} - 131.5$$

From this, °A. P. I. of the gasoline at the temperature of the gasoline in the apparatus equals $$\frac{141.5}{X} - 131.5$$

This may be corrected to °A. P. I. at 60° F. by the use of the customary correction factors.

The values of the vapor specific gravities can be experimentally determined for several tank pressures and temperatures and extended by means of the gas laws.

I claim:

1. A device for determining the specific gravity of a volatile liquid comprising a supporting member, a loop of tubing having transparent legs, a conduit connected to the upper portion of said loop, a conduit connected to the lower portion of said loop, and a conduit connected to one of said legs.

2. A device for determining the weight relationship of a volatile liquid to a standard liquid, the volatile liquid being confined in a receptacle having a vapor space above the volatile liquid, comprising a closed vessel in the form of a loop having two transparent legs each at an angle to the horizontal, a conduit connected to the upper part of the vessel for communication with the vapor space in the receptacle, a conduit connected to one leg of the vessel for communication with the receptacle below the surface of the volatile liquid, and conduits in communication with the vessel for admitting standard liquid and draining the same.

3. A system for determining the weight relationship of a volatile liquid to a standard liquid comprising a receptacle containing the volatile liquid and having a vapor space therein above the volatile liquid, a closed vessel in the form of a loop having two legs, means connected with said vessel for admitting the standard liquid thereto, means for venting the vessel to admit the standard liquid, means connecting the vessel with the receptacle to admit volatile liquid to one of said legs and means connecting the upper portion of the vessel and the vapor space of the receptacle.

4. A system for determining the weight relationship of a volatile liquid to a standard liquid comprising a receptacle containing the volatile liquid and having a vapor space therein above the volatile liquid, a sealed vessel shaped so that a column of the volatile liquid can be balanced against a column of the standard liquid therein, a conduit connecting the interior of the vessel with the vapor space of the receptacle, means for introducing standard liquid to the vessel, means for introducing the column of volatile liquid into the vessel to balance a column of the standard liquid therein, and means for determining the quantity of liquid in each column.

5. A system for determining the weight relationship of a volatile liquid to an immiscible standard liquid comprising a receptacle containing the volatile liquid and having a vapor space therein above the volatile liquid, a U-shaped vessel, the legs of the U-shaped vessel extending in an upward direction, a body of standard liquid in the U-shaped vessel, means for placing the upper portion of the legs of the U-shaped vessel in communication with the vapor space of the receptacle, means for introducing a body of the volatile liquid into one leg of the U-shaped vessel whereby a head of the standard liquid in the other leg is balanced by the body of volatile liquid, and means for measuring the quantity of the head of standard liquid and the quantity of the body of volatile liquid.

WILL SWERDLOFF.